United States Patent [19]

Burger et al.

[11] Patent Number: 5,445,834
[45] Date of Patent: Aug. 29, 1995

[54] GREEN CHEWING GUM BASE

[75] Inventors: Jacob C. Burger, Hoevelaken; Petrus J. J. M. Sijtsema, Bussum; Jan D. Lakeman, Zaandam; Frederick W. Cain, Voorburg, all of Netherlands

[73] Assignee: Loders Croklaan B.V., Wormervser, Netherlands

[21] Appl. No.: 294,843

[22] Filed: Aug. 29, 1994

Related U.S. Application Data

[63] Continuation of Ser. No. 37,189, Mar. 26, 1993.

[30] Foreign Application Priority Data

Mar. 26, 1992 [EP] European Pat. Off. .......... 92200859

[51] Int. Cl.$^6$ .............................................. A23G 3/30
[52] U.S. Cl. .............................................. 426/3; 426/4
[58] Field of Search ........................................ 426/3-6

[56] References Cited

U.S. PATENT DOCUMENTS

| | | | |
|---|---|---|---|
| 1,534,929 | 4/1925 | Dunham | 426/4 |
| 4,387,108 | 6/1983 | Koch et al. | 426/4 |
| 4,634,593 | 1/1987 | Stroz et al. | 426/5 |
| 5,085,872 | 2/1992 | Patel et al. | 426/4 |
| 5,087,459 | 2/1992 | Chuu et al. | 426/4 |
| 5,178,889 | 1/1993 | Reed et al. | 426/3 |
| 5,192,562 | 3/1993 | Grey et al. | 426/4 |

FOREIGN PATENT DOCUMENTS

| | | |
|---|---|---|
| 0067665 | 12/1982 | European Pat. Off. . |
| 0421670 | 4/1991 | European Pat. Off. . |
| 2115461 | 10/1972 | Germany . |
| 347376 | 4/1931 | United Kingdom . |
| 378073 | 8/1932 | United Kingdom . |
| 9317578 | 9/1993 | WIPO ........................ 426/3 |

*Primary Examiner*—Jeanette Hunter
*Attorney, Agent, or Firm*—Cushman Darby & Cushman

[57] ABSTRACT

Greener chewing gum base or bubble gum base (i.e. better biologically degradable and healthier) is obtained by replacing the paraffin component of a conventional chewing gum base by a triglyceride composition with an $N_{35} \geq 40$, a $(C_{16}+C_{18})$ saturated fatty acid content of 40–100 wt. %, a $C_{18:t}$-content of 0–60 wt. % a $(C_{12}+C_{14}+C_{16})$ saturated fatty acid content of at least 30 wt. % and a $(C_{12}+C_{14})$ saturated fatty acid content of 0–40 wt. %.

5 Claims, No Drawings

GREEN CHEWING GUM BASE

This is a continuation of application Ser. No. 08,037,189, filed Mar. 26, 1993.

Our invention concerns new, "green" chewing gum base. It should be understood that the term chewing gum, as used here, also includes bubble gum. For a proper understanding of the case some definitions will be given first. A chewing gum or bubble gum base is defined as the masticatory substance, which is insoluble in salvinary fluids and can be formulated from natural and/or synthetic gums, resins, fillers, platicizers, waxes and antioxidants. Chewing gum or bubble gum consists of two major components, i.e.: 1) the chewing gum base and 2) a non-masticatory part, consisting mainly of sweeteners, softeners and flavour ingredients. Although in the past (cf. GB 347,376; GB 378,073; U.S. Pat. No. 1,534,929) chewing gum bases have been formulated that contain a fat component, these products never were commercialized, as the product properties, such as hardness, stiffness, shortness of the texture, initial bite or bubble forming capacity were not acceptable. Therefore, a solution for above problems was sought in another direction, i.e. by incorporation of mineral waxes (or paraffins) in the chewing gum base (cf. De 2,115,461; fat:wax ratio=1:2-2:1; EP 421 670). It was even still stated in 1990 in a Report on the use of mineral hydrocarbons in Food and Food Processing-Chewing Gum, Cheese Wax and Food Contact Materials, from the Minestry of Agriculture, Fisheries and Food from 1990 that mineral hydrocarbon waxes are an important component of chewing gum base and that manufacturers considered this component to be vital. Therefore, the more recent chewing gum base always contains a paraffin, such as liquid paraffin or microcrystalline paraffin wax. However, the presence of these paraffins has a number of disadvantages. E.g. the biological degradation of paraffin waxes is rather slow, therefore the wax, present in waste chewing gum becomes a burden for the environment. Moreover, recently indications became available from which could be concluded that the paraffins are not healthy. Therefore, we have sought for materials that could replace the paraffin component of chewing gum base, without adversely affecting the properties of the chewing gum base. Our research has resulted in our invention, i.e. chewing gum bases comprising conventional natural and/or synthetic elastomeric and/or resinous components, which gum bases are characterized by the presence of at least 15 wt. %, in particular 15-50 wt. % and preferably 25-40 wt. % on the total base of a triglyceride composition that displays a solid fat index (not stabilized, NMR-pulse) at 35° C. of at least 40, preferably 50-100, while the triglycerides comprise 40-100 wt. % ($C_{16}+C_{18}$) saturated fatty acids, 0-60 wt. % $C_{18:1}$ fatty acids (both cis and trans) at least 30 wt. %, preferably at least 35 wt. % ($C_{12}+C_{14}+C_{16}$) saturated fatty acids and 0-40 wt. % ($C_{12}+C_{14}$) saturated fatty acids.

It should be stated here that chewing gum bases are known in the literature (see DE 2 115 461 and EP 421 670) that contain in addition to the conventional components, present in chewing gum base (including the paraffin component) a triglyceride composition. Indicated triglycerides in the EP document are partially hydrogenated vegetable oils, partially hydrogenated soy bean oil, hydrogenated cotton seed oil and mixtures thereof (page 4, lines 1-4). From the examples it can be concluded that satisfactory results were only obtained when the triglycerides are present together with the paraffin waxes. The only example (=gum base 3 of table 1), wherein the gum base contains triglycerides, whereas paraffin wax is absent, is a comparative example, illustrating the necessity of the presence of the paraffin wax in the composition. According to this comparative example hydrogenated cotton seed oil, partly hydrogenated soybean oil and hydrogenated vegetable oil are present. As no information is available about the vegetable oil, it is unknown, what the $N_{35}$ value of this composition is. The paraffins need to be present in the gum base in order to decrease the tackiness of the chewing gum (page 2, lines 18-19). The triglycerides function as a solvent for the chewing gum base (page 4, lines 1-6). The amounts of triglycerides range from 15-40 wt. % (on gum base). With only triglycerides present the texture and flavour character of the gum were unsatisfactory (page 6, lines 26-29). We have overcome the problems of texture and flavour by the selection of our triglycerides. Incorporation of those triglycerides, as replacers of the paraffin component resulted in bubble gums with excellent texture and flavour, which, however, are "greener" than the bubble gums according to EP 421.670.

Preferred ranges of the fatty acid components of our triglyceride compositions are 70-100 wt. % of saturated ($C_{16}+C_{18}$); 0-30 wt. % of cis and/or trans $C_{18:1}$ and 0-30 wt. % of saturated ($C_{12}+C_{14}$).

The preferred $N_{35}$ value of our triglyceride composition ranges from 70 to 100. The incorporation of the triglycerides in our chewing gum bases enables the preparation of chewing gum base, wherein less than 0.5 wt. % of paraffins are present. This can be achieved by replacing the paraffin wax by our triglyceride compositions.

Preferred triglyceride compositions that lead to excellent chewing gum bases and chewing gums are:

1. a fully hardened stearin fraction from a hardened mixture of soybean oil or cottonseed oil and palm oleine, or other vegetable liquid oils.
2. a stearin fraction from a non-hardened palm oil (which therefore will not contain $C_{18:1}$; trans).
3. a stearin fraction of an interesterified mixture of vegetable oils high in triglycerides with at least 16 C-atoms and triglycerides high in lauric and/or myristic acid residues.
4. mixtures of one or more of the fractions of 1-3.

The preferred fats are 1 and 2 above.

In chewing gum bases conventionally the following ingredients can be present: elastomers, resins, fillers, anti-oxidants and softeners. As elastomer natural and synthetic elastomers and/or natural and synthetic resins can be used. A listing of useful elastomeric or resinous ingredients is:

I. Natural gums of veqetable origin

A group of about 15 types of natural gums, for instance:

| | |
|---|---|
| Chick | Jelutong |
| Gutta Hong Kong | Gutta soh |
| Gutta Katiau | Gutta Pontiansk |
| Sorud | Priello |
| Niger Gutta | Tunu |
| Chilte | Gutta Rosa dinha |
| Gutta Siak | |

2) Synthetic gums

Butadiene-styrene-copolymer (SBR Rubber)
Isobutylene-isopropene copolymer (Butyl Rubber)
Acrylic co-polymers
Polyvinylacetate and/or co-polymers
3) Synthetic and natural resins and their derivatives
Resins such as wood resin esters and ester gums
Penta erythril esters from wood resin
Penta erythril esters of partially hydrogenated wood resin
Glycerol ester of wood resin
Glycerol ester of partially dimerized resin
Glycerol ester of polymerized resin
Glycerol ester of tall oil resin
Glycerol ester of wood resin
Glycerol ester of partially hydrogenated wood/gum resin
Glycerol ester of partially hydrogenated methyl ester of resin
Terpene resins Fillers that can be used in chewing gum bases are e.g.: aluminiumhydroxyde, calcium carbonate (e.g. limestone), talc, magnesium carbonate or aluminium silicate (e.g. Kaolin).

Softeners that can be applied are e.g. glycerol or emulsifiers, in general lecithin. However, any known emulsifier is applicable.

In addition to those components a sweetener can be present. Suitable sweeteners are the conventional sugars, such as sucrose, glucose, etc. High intensity sweeteners, however, can also be used.

Part of our invention is, of course, also the chewing gums that contain in addition to the other conventional chewing gum ingredients a chewing gum base according to our invention.

Also the use of triglyceride compositions in chewing gum bases is part of the invention. Herein triglycerides that display an $N_{35}$ of at least 40, an $(C_{16}+C_{18})$ sat. fatty acid content of 40–100 wt. %, an $C_{18:1}$ content of 0–60 wt. %; an $(C_{12}+C_{14}+C_{16})$ saturated fatty acid content of at least 30 wt. % and an $(C_{12}+C_{14})$ sat. fatty acid content of 0–40 wt. % are used as replacers for paraffins, present in conventional chewing gum bases in order to obtain a healthier and biologically better degradable chewing gum.

EXAMPLES

The following bubble gums were prepared:

|  | wt % |
| --- | --- |
| triglycerides | 6.3 |
| standard gum base minus the waxes | 11.7 |
| sugar | 50.0 |
| dextrose | 10.0 |
| glucose syrup (85%) | 20.0 |
| glycerine | 1.0 |
| flavour | 1.0 |

The following triglycerides were used:
1. soy-bean oil ($N_{35}=0$)
2. hard soy bean oil ($N_{35}=97$)
3. palm oil mid fraction ($N_{35}=3$)
4. [hard. (bean oil/palm oleine)] mid fr. ($N_{35}=10$)
5. hard. palm kernel stearin fract. ($N_{35}=2$)
6. palm oil oleine fraction ($N_{35}=0$)
7. * fully hard. stearin fraction from a hard. mixture of (bean oil/palm oleine) ($N_{35}=97$)
8. * palm oil stearin fraction ($N_{35}=78$)

*according to the invention.

The fatty acid distribution of those triglycerides was as follows:

| TG |  | 1 | 2 | 3 | 4 | 5 | 6 | 7* | 8* |
| --- | --- | --- | --- | --- | --- | --- | --- | --- | --- |
| Fatty | $C_{12}$ | 0 | 0 | 0.1 | 0.1 | 55 | 0.6 | 0.3 | 0 |
| acid: | $C_{14}$ | 0 | 0.1 | 0.9 | 0.8 | 21 | 1.4 | 0.8 | 1.3 |
|  | $C_{16}$ | 10 | 10.6 | 55.6 | 27.7 | 9 | 36.4 | 37 | 76.9 |
|  | $C_{18}$ | 3.5 | 88.5 | 5.9 | 5.7 | 11 | 2.9 | 61.5 | 5.6 |
|  | $C_{18:1}$ (c + t) | 28 | 0 | 36.5 | 64.7 | — | 45.4 | 0 | 14.1 |
|  | $C_{18:2}$ | 58.5 |  |  |  |  |  |  |  |

The bubble gums were prepared according to the following procedure:
1. the standard gum base minus the waxes is melted at 80°–90° C.
2. the melted gum base is fed into a horizontal Z-blade mixer (indirectly heated at 60° C.)
3. the triglycerides, glycerine and glucose are added and mixed for 5 min.
4. ⅓ of the powdered sugar is added; mixing for 5 min.
5. Another ⅓ of the powdered sugar is added; again mixing for 5 min.
6. the last ⅓ of the sugar is added and again mixing for 5 min.
7. the flavour is added in two parts, followed by thorough mixing.
8. the bubble gum is removed from the mixer.
9. the gum is extruded in a thick sheet.
10. the gum is conditioned for 24 hrs in air at 20° C. and 50% humidity.

These gums were evaluated; the results are mentioned underneath:
1. Using triglycerides 1 and 6 resulted in very soft unsatisfactory compositions during the processing.
2. Using triglycerides 3, 4 and 5 resulted in very soft and a little sticky composition during the processing.
3. Triglyceride 2 resulted into a composition that was a bit too hard, too stiff, too short in texture, which initial bite was too hard, while it was difficult to bubble it.
4. Triglycerides 7 and 8 resulted in a very good consistency.

The above compositions were also evaluated on:
1. initial bite (scale: very firm, normal, soft)
2. rate of hydration (none, medium, rapid)
3. texture (crumbly, in few pieces, one piece)
4. firmness (very firm, medium, falls apart)
5. stick to teeth (not acceptable, slight, none)
6. quality (waxy or not)
7. ease of blowing bubbles (impossible firm; easy; impossible soft).

We found that the compositions 7 and 8 were acceptable in all aspects, whereas composition 2, although better than the other 5 compositions, still was not good enoguh and the other 5 compositions were all unacceptable during the intermediate chewing phase (fell apart).

We claim:
1. In a chewing gum base comprising at least one member of the group consisting of natural and synthetic elastomeric and resinous components, the improvement wherein the base also comprises at least 15 wt. %, on the total base, of a triglyceride composition that displays a solid fat index, not stabilized, at 35° C. measured by NMR pulse of at least 40, the triglyceride composition comprising 40–100 wt. % $C_{16}+C_{18}$ saturated fatty acids; 0–60 wt. % $C_{18:1}$ fatty acid, at least 35 wt. % $C_{12}+C_{14}+C_{16}$ saturated fatty acids and 0–40 wt. % $C_{12}+C_{14}$ saturated fatty acids, said gum base containing a maximum of 0.5 wt. % of paraffins and said triglyceride composition comprising a palm oil or hardened palm oil fraction.

2. The chewing gum base of claim 1 wherein the triglyceride comprises a fully hardened stearin fraction from a hardened mixture of bean oil and palm oil or a stearin fraction of non-hardened palm oil.

3. A method of providing a healthier and biologically better degradable chewing gum compared to chewing gums which include paraffin as a component in the gum base, said method comprising using, as the gum base, a gum base according to claim 1.

4. A method of providing a healthier and biologically better degradable chewing gum compared to chewing gums which include paraffin as a component in the gum base, said method comprising using, as the gum base, a gum base selected from the group consisting of at least one of conventional natural, synthetic elastomeric and resinous components, and wherein the base also comprises at least 15 wt. % of the total base of a triglyceride composition that displays a solid fat index, at 35° C. measured by NMR pulse of at least 40, while the triglyceride composition comprises 40-100 wt. % saturated fatty acids; 0-60 wt. % $C_{18:1}$ fatty acid, at least 30 wt. % saturated fatty acids and 0-40 wt. % saturated fatty acids.

5. A method according to claim 4 wherein the base comprises 50-50 wt. % of the triglyceride composition, the NMR pulse is 50-100, and the triglyceride composition comprises at least 35 wt. % $C_{12}+C_{14}+C_{16}$ saturated fatty acids.

* * * * *